3,075,008
PRODUCTION OF POLYCHLOROBENZOIC ACID
Theodore A. Girard, Wayne Township, Passaic County, N.J., and Walter A. Neumann, Bronxville, N.Y., assignors to Heyden Newport Chemical Corporation, New York, N.Y., a corporation of Delaware
No Drawing. Filed Apr. 29, 1958, Ser. No. 731,619
4 Claims. (Cl. 260—523)

This invention is a new process for producing polychlorobenzoic acid from mixed isomers of polychlorotoluenes and, in one form for producing such acid with enrichment in the 2, 3, 6 trihalo or other 2, 6 isomer in relation to the content of such isomer in the polychlorotoluene. More particularly, it is an improved step, useful in such production and elsewhere, or oxidizing polyhalobenzaldehydes to the corresponding benzoic acids.

Heretofore, the newly discovered uses of trichlorobenzoic acid isomers, and in particular of mixtures containing around 65% of the 2, 3, 6 isomer, as in herbicidal compositions, have led to the development of improved processes for producing such mixed isomers. A need has remained nevertheless for improvement of the process in the direction of simplicity and economy. Further, the known processes for producing polyhalobenzoic acids have not yielded a product having as nearly uniform an isomeric composition as is desired for a commercial herbicidal product and have not yielded a product having an excess content of the 2, 3, 6 isomer so as to permit control of the 2, 3, 6 content in the ultimate herbicidal product by controlled blending with other isomers or mixtures having a lower content of the 2, 3, 6 isomer.

It is to be understood that this invention is applicable to the preparation of polyhalobenzoic acids from a single or mixture of isomers of polyhalogenated toluenes. However, for ease of illustration the invention will hereafter be described and explained with reference to the conversion of toluene or orthochlorotoluene to trichlorobenzoic acid, unless otherwise indicated.

Trichlorobenzoic acid may be prepared by nuclear-chlorinating toluene or o-chlorotoluene in the presence of a catalyst such as iron or aluminum chloride. Said reaction will yield a nuclear-chlorinated toluene consisting mainly of the 2,3,4-2,3,6 and 2,4,5 trichloro isomers. The trichlorotoluene isomers are then side-chain chlorinated to yield a mixture of trichlorobenzalchloride and trichlorobenzotrichloride. The above reactions may be illustrated by the following:

I.
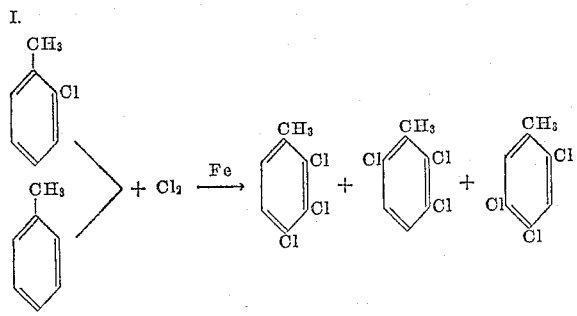

II.
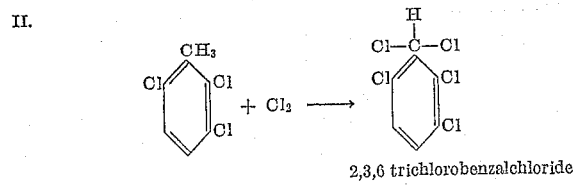
2,3,6 trichlorobenzalchloride

III.
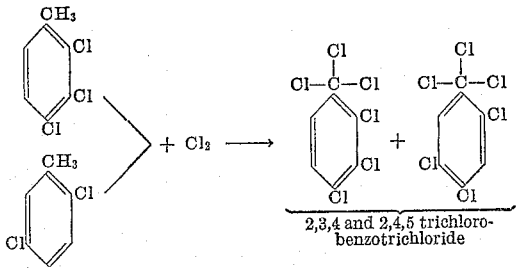

Reaction I will also produce other isomers of trichlorotoluene and also mixed isomers of dichloro and tetrachlorotoluene which may or may not be separated as desired. Hydrogen chloride also is produced in all of these reactions.

By hydrolysis of the benzylidene chloride and benzotrichloride, a mixture of trichlorobenzaldehyde and trichlorobenzoic acid is obtained. The following reaction illustrates the hydrolysis step:

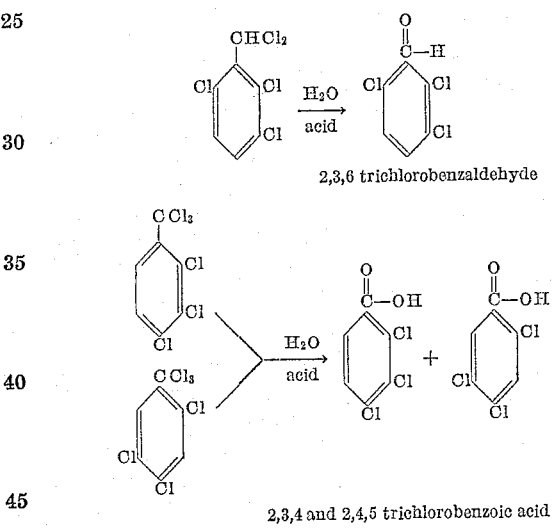

If desired, but not necessarily, the aldehyde and acid may be separated.

It is to be noted that the exhaustive side-chain chlorination resulted in the formation of different products from a standpoint of the number of chlorine atoms attached to the side-chain carbon. In the case of the isomers containing halogens in both the 2 and 6 positions, the 2,3,6-isomer, only two chlorine atoms replace hydrogen on the methyl side-chain carbon, whereas with isomers containing halogen in not more than one of the 2 and 6 positions, such as the 2,3,4 and 2,4,5 isomers, chlorine replaces three hydrogen atoms on the side-chain carbon. Thus, upon subsequent hydrolysis, the dichloro side-chain compound yields the trichlorobenzaldehyde and the trichloro compound, the trichlorobenzoic acid. The difference in functional groups, i.e. aldehyde and acid, allows for the easy separation of the 2,3,6 trichloro compound.

The significance of the separation is that an acid mixture enriched in 2,3,6 isomer may be obtained in high yield by oxidation of the intermediate aldehyde. As stated previously, amongst the trichlorobenzoic acids the 2,3,6 isomer is the most effective herbicide. Thus, the 2,3,6 acid-rich mixture may be used as is or may be further blended with the acid product of the hydrolysis, or with a trichlorobenzoic acid, otherwise produced and with little or no 2,3,6 isomer, to yield an ultimate product of desired and controlled content of 2,3,6 trichlorobenzoic acid.

As a variant of the process as above described, the step of separating the trichlorobenzoic acid from the product of the hydrolysis step may be omitted. In such case, these acid isomers containing none of the 2,3,6 isomer or other 2,6 isomers are present as a component of the mass subjected to the oxidation step. Ordinarily, their presence would interfere with the oxidation of the aldehyde component of the hydrolysis product but by following the improved oxidation hereinafter set forth, the problem is alleviated. The end product is diluted, with respect to content of the 2,3,6 isomer of trichlorobenzoic acid, as compared with the end product of the process which includes the separating step following the hydrolysis, but the product nevertheless, compares favorably with that of known processes and can easily be made to have a 2,3,6 isomer content of 50–80% and especially around 65%.

Likewise, there can be a partial separation of the acid product of hydrolysis, followed by oxidation of the remainder of the hydrolysis product, with correspondingly less dilution of the end product to the extent of the partial removal of the acid isomers containing no 2,3,6 isomer.

Having obtained a mixture of trichlorobenzaldehyde and trichlorobenzoic acid or, if desired, having performed a partial or substantially complete separation of aldehyde and acid the problem remains to convert the 2,3,6 trichlorobenzaldehyde to the corresponding benzoic acid. Only after said conversion will a supply of polychlorobenzoic acid rich in 2,3,6 isomer be obtained.

It has been found that the presence of trichlorobenzoic acid either from the conversion of the aldehyde or as the result of incomplete separation of the hydrolysis product impedes the oxidation reaction. We have discovered that in an oxidizing system wherein the acid formed or present ab-initio is removed, high yields of 2,3,6 trichlorobenzoic acid can be obtained. We have discovered that by oxidizing the hydrolysis product, with or without separation of acid, in the presence of an aqueous alkaline medium suitable for converting the benzoic acids into a water soluble salt, a substantial increase in yield of acid is obtained.

Preferably, the hydrolysis product is dispersed in the alkaline medium by liquefying the hydrolysis product. The acid formed by the oxidation or present as a component of the hydrolysis product by being converted into a water-soluble salt of the acid is thus removed from the organic or water-insoluble phase, i.e. the phase containing the isomeric aldehydes.

The alkaline solution may be prepared by dissolving in water a water soluble salt former, that is, a base or alkaline salt that will form a water soluble salt with trichlorobenzoic acid. The suitability of any compound as such a salt former can be determined by mixing trichlorobenzoic acid with an aqueous solution of the alkaline compound and if the acid is converted to a water soluble salt, the compound can be used in the present process. Suitable salt formers are, for example, sodium and calcium hydroxides and carbonates. An excess of alkaline compound is provided to maintain an alkaline pH and insure complete conversion of all of the trichlorobenzoic acid into a water-soluble salt. It is preferred to run the oxidation at a pH of 8, or higher, for example in the range of pH 8–10. The amount of water may vary widely and only needs to be large enough to dissolve the quantity of salt of trichlorobenzoic acid that is formed. Thus the minimum quantity of water may vary depending on the solubility of the product. Excess water may be used.

It has been further discovered that air may be used as the oxidizing agent when a suitable catalyst is employed. Air has the advantage of being the most economical of all the oxidizing agents. However, heretofore, the oxidation of polyhalobenzaldehydes with air has resulted in very poor yields. The catalysts found suitable for this invention are the peroxides. Peroxides are derivatives of hydrogen peroxide or compounds containing the bivalent =O—O— or =$O_2$ group, in which two oxygen atoms are singly linked. Illustrative peroxides are, for example, sodium pyrophosphate peroxide, sodium carbonate peroxide, sodium peroxide, potassium persulfate, urea peroxide, sodium perborate and benzoyl peroxide. The peroxide is preferably added in an amount ranging from 1–15% by weight of the aldehyde, though lesser or greater amounts may be employed.

The following examples show the preparation of polychlorobenzoic acids according to the teachings of this invention.

*Example I*

Ten grams of trichlorobenzaldehyde containing 87% of the 2,3,6-isomer was placed in a flask along with 21.2 ml. of a 5% solution of sodium carbonate in water and 0.4 gram of an emulsifying agent as an aid in dispersing the aldehyde. In addition 80 ml. of water was added to the flask and the resulting mixture heated at 85° C., air was bubbled through the mixture while being maintained at about 85° C. for a period of about 4 hours. Thereafter the mixture was cooled and the aqueous phase having a pH value of 9 was separated and washed with ether to remove any unreacted aldehyde. The aqueous solution was acidified with hydrochloric acid to convert the sodium trichlorobenzoate to the acid which precipitated. The precipitated material was separated by filtration, washed with water and dried. The trichlorobenzoic acid product weighed 2.4 grams and represented a yield of 26% based on the total amount of trichlorobenzaldehyde charged. This trichlorobenzoic acid product contained 82.3% of 2,3,6-trichlorobenzoic acid.

*Example II*

In a suitable vessel equipped with agitator was charged 10 parts of trichlorobenzaldehyde (assay 87%) (prepared by the nuclear chlorination of o-chlorotoluene, side-chain chlorination to yield a mixture of trichlorobenzylchloride and trichlorobenzotrichloride, subsequent hydrolysis of the mixture to obtain corresponding aldehyde and acid and then separation of acid) one part sodium pyrophosphate peroxide and 80 parts of water. A stream of air was passed through the mass for a period of 5 hours while maintaining the temperature at about 77° C. Sufficient 5% aqueous sodium carbonate solution was added during this period to maintain a pH of about 9. After cooling the aqueous layer was separated from the solidified oil. Upon acidification and filtration the aqueous portion yielded 3.4 parts of trichlorobenzoic acid corresponding to a 35.4% yield.

The solidified oil residue, consisting of unreacted aldehyde plus impurities, was recharged to the reaction vessel with 0.4 part of sodium pyrophosphate peroxide and 40 parts water being added. Air was passed through this mixture for an additional 4-hour period while maintaining the reaction mass at a temperature of about 77° C. and pH 8.5. Upon cooling the aqueous phase was separated and acidified to yield 3.0 parts of trichlorobenzoic acid representing a conversion of 32% to give an overall yield of 67.4% based on the total amount of aldehyde charged. The overall content of the 2,3,6-isomer was 80.7%.

*Example III*

Air was passed through a mixture of 50 grams of trichlorobenzaldehyde containing 82.4% of 2,3,6-isomer, 50 ml. of a 5% solution of sodium carbonate in water and 1 gram of dibenzoyl peroxide over a period of 14 hours while the reaction mixture was maintained at a temperature in the range of 77–80° C. During the reaction the pH of the reaction mixture was held in the range of 8–10 by the addition of 5% sodium carbonate aqueous solution at hourly intervals. A total of 250 ml. of sodium carbonate solution was required. At the end of the reaction period, the mixture was cooled and the aqueous layer was separated from the unreacted solidified aldehyde by filtration. The separated aldehyde residue was washed with two 50 ml. portions of water and this wash water was combined with the aqueous filtrate. The trichlorobenzoic acid was separated by adding 35 ml. of 37% hydrochloric acid to the aqueous solution. The acid first separated as an oil which solidified upon cooling. The precipitated solid was separated, washed with water and dried. The trichlorobenzoic acid product weighed 26.3 grams and constituted a yield of 56% based on the total amount of trichlorobenzaldehyde charged to the reaction. The product contained 80.5% of 2,3,6-trichlorobenzoic acid.

A similar run was carried out utilizing a 5% solution of sodium hydroxide and air was passed through the mixture for a period of 8 hours. Except for these changes the reaction conditions were the same. The amount of trichlorobenzoic acid produced constituted a yield of 49% based on the amount of trichlorobenzaldehyde charged to the reaction. The product contained 76.5% of the 2,3,6-isomer.

The separated unreacted aldehyde can be recycled through another oxidizing reaction, either alone or along with a fresh amount of aldehyde, thereby increasing the overall yield.

It is to be understood that the various features of the hereinbefore described invention may be used separately, although they are preferably used in combination to obtain the highest yield. Thus when using air or gaseous oxygen in any form as an oxidizing agent, it is preferable to remove the acid present in the starting material, if any, and the acid formed during the oxidation reaction by use of an aqueous solution of an alkaline salt former to form a water soluble salt of trichlorobenzoic acid which will be dissolved in the aqueous phase and thereby removed from the organic phase. The aqueous solution of the salt former can be used with any other oxidation procedure to remove the trichlorobenzoic that can be carried out under alkaline conditions.

The temperature during the reaction preferably is above the melting point of the material being oxidized, so the material will be in a liquid condition and better contact between the organic material and aqueous material can be maintained throughout the reaction. However, lower temperatures may be used, for example a temperature as low as 25° C. can be used although with such low temperatures it is preferable to have the aldehyde in a finely divided or dispersed condition. The trichlorobenzaldehyde can be maintained in a finely divided condition, for example, by distributing it over finely divided clay and this clay can then be dispersed in water. Alternatively, trichlorobenzaldehyde may be dissolved in a water immiscible solvent such as xylene and upon agitation a dispersion can be formed. While the upper temperature is not critical, temperatures below 100° C. will generally but not necessarily be used to avoid undue loss of water.

The present process including its variations, hereinbefore described in detail are applicable to the oxidation of all polychlorobenzaldehydes including dichlorobenzaldehyde, trichlorobenzaldehyde, tetrachlorobenzaldehyde and mixtures thereof, any of which may contain dichlorobenzoic acid, trichlorobenzoic acid, tetrachlorobenzoic acid or mixtures thereof. Thus a mixture of trichlorobenzaldehyde, and trichlorobenzoic acid such as obtained by side chain chlorinating trichlorotoluene to trichlorobenzalchloride and trichlorobenzotrichloride and then hydrolyzing this mixture can be oxidized. Where toluene or o-chlorotoluene is the starting material which is nuclear chlorinated, the trichlorotoluene will usually contain about 50–80% of the 2,3,6-isomer and the resulting trichlorobenzaldehyde - trichlorobenzotrichloride will contain about 50–80% of the chloride. During the nuclear chlorination step some dichloro and tetrachlorotoluene will be formed and the di and tetrachlorinated toluenes may or may not be separated. If not separated the di and tetrachlorotoluenes having chlorine in both positions ortho to the side chain will be converted during subsequent hydrolysis of the side chain chlorinated products to the corresponding polychlorobenzaldehydes while the other isomers having one or no chlorine atoms ortho to the side chain will in the main result in the formation of the corresponding polychlorobenzoic acids.

It also has been discovered that the aforementioned polychlorobenzaldehydes originally containing large amounts of polychlorobenzoic acid can be oxidized in high yield to polychlorobenzoic acid utilizing nitric acid as the oxidizing agent. For example, a mixture of trichlorobenzaldehyde mainly consisting of 2,3,-6-trichlorobenzaldehyde and trichlorobenzoic acid substantially free of the 2,3,6-isomer can be converted in high yield to chlorobenzoic acid. This can be done even when the aldehyde-acid mixture contains 20–50% of the acid. With such a high percentage of trichlorobenzoic acid present, it is surprising that it does not interfere with oxidation of the aldehyde particularly in view of the fact that 2,3,6-trichlorobenzaldehyde is, in general, the least reactive isomer. Excellent results can be obtained with 1–2 moles of nitric acid (calculated as 100% $HNO_3$) per mole of aldehyde, although larger amounts of nitric acid may be used. The nitric acid used may vary from 90% nitric acid down to very dilute nitric acid. For example, 70% nitric acid may be added to a reaction mixture containing no water or very large quantities of water so that the nitric acid is greatly diluted.

*Example IV*

A hydrolysis mixture containing about 3720 pounds (17.8 moles) of trichlorobenzaldehyde and about 1250 pounds of trichlorobenzoic acid (5.6 moles) and about 400 gallons of water was heated to a temperature in the range of 90° C. to reflux temperature and then 1655 pounds of 67.3% nitric acid was added over a period of about 10 hours while maintaining the reaction mixture at the aforesaid temperature. After a two hour holding period to be certain the reaction was completed the mixture was cooled at 85° C. in three hours and the organic layer was separated from the aqueous layer. In this manner a yield of 21 pound moles, or more, of trichlorobenzoic acid can be obtained which constitutes a yield of 90% based on the number of moles of material charged and requires conversion of about 85% of the trichlorobenzaldehyde to the acid. The time and temperatures are not critical. Sulfuric acid was present in the starting material as an impurity and this acid may or may not be present during the oxidation step.

Having described the present invention in detail, it is to be understood that variations may be made and is not limited to the particular conditions described except as set forth in the accompanying claims.

We claim:

1. The method of preparing trichlorobenzoic acid containing 50% to 80% of 2,3,6-trichlorobenzoic acid from a mixture containing 50% to 80% of 2,3,6-trichlorobenzaldehyde and 20% to 50% of trichlorobenzoic acid substantially free of the 2,3,6-isomer which comprises contacting said trichlorobenzaldehyde-trichlorobenzoic acid mixture in an aqueous solution of an alkaline material selected from the group consisting of sodium carbonate, sodium hydroxide, calcium carbonate, and calcium hydroxide, with air at a temperature between approximately 25° C. and 100° C. and in the presence of a peroxide catalyst selected from the group consisting of sodium pyrophosphate peroxide, sodium carbonate peroxide, sodium peroxide, potassium persulfate, urea peroxide, sodium perborate, and benzoyl peroxide and thereafter isolating trichlorobenzoic acid containing 50% to 80% of 2,3,6-trichlorobenzoic acid from said medium.

2. The method of preparing trichlorobenzoic acid containing 50% to 80% of 2,3,6-trichlorobenzoic acid from a mixture containing 50% to 80% of 2,3,6-trichlorobenzaldehyde and 20% to 50% of trichlorobenzoic acid substantially free from 2,3,6-trichlorobenzoic acid which comprises the steps of (1) dispersing said trichlorobenzaldehyde-trichlorobenzoic acid mixture in an aqueous solution of an alkaline material selected from the group consisting of sodium carbonate, sodium hydroxide, calcium carbonate, and calcium hydroxide, said solution containing a molar amount of said alkaline material that is larger than the combined molar amounts of trichlorobenzaldehyde and trichlorobenzoic acid in the dispersion, and (2) contacting the dispersion with air at a temperature between the melting point of 2,3,6-trichlorobenzaldehyde and approximately 100° C. and in the presence of approximately 1% to 15%, based on the weight of 2,3,6-trichlorobenzaldehyde, of a peroxide catalyst selected from the group consisting of sodium pyrophosphate peroxide, sodium carbonate peroxide, sodium peroxide, potassium persulfate, urea peroxide, sodium perborate, and benzoyl peroxide, thereby forming trichlorobenzoic acid containing 50% to 80% of the 2,3,6-isomer.

3. The method of preparing trichlorobenzoic acid containing 50% to 80% of 2,3,6-trichlorobenzoic acid from a mixture containing 50% to 80% of 2,3,6-trichlorobenzaldehyde and 20% to 50% of trichlorobenzoic acid substantially free of 2,3,6-trichlorobenzoic acid which comprises the steps of (1) dispersing said trichlorobenzaldehyde-benzoic acid mixture in an aqueous sodium carbonate solution, said solution containing a molar amount of sodium carbonate that is larger than the combined molar amounts of trichlorobenzaldehyde and trichlorobenzoic acid in the dispersion, (2) contacting the dispersion with air at a temperature between the melting point of 2,3,6-trichlorobenzaldehyde and approximately 100° C. and in the presence of approximately 1% to 15%, based on the weight of 2,3,6-trichlorobenzaldehyde, of a peroxide catalyst selected from the group consisting of sodium pyrophosphate peroxide, sodium carbonate peroxide, sodium peroxide, potassium persulfate, urea peroxide, sodium perborate, and benzoyl peroxide, and (3) isolating trichlorobenzoic acid containing 50% to 80% of 2,3,6-trichlorobenzoic acid.

4. The method of preparing trichlorobenzoic acid containing 0% to 80% of 2,3,6-trichlorobenzoic acid from a mixture containing 50% to 80% of 2,3,6-trichlorobenzaldehyde and 20% to 50% of trichlorobenzoic acid substantially free of 2,3,6-trichlorobenzoic acid which comprises the steps of (1) dispersing said trichlorobenzaldehyde-trichlorobenzoic acid mixture in an aqueous sodium carbonate solution thereby forming a dispersion having a pH above 8; (2) contacting said dispersion with air at a temperature between the melting point of 2,3,6-trichlorobenzaldehyde and approximately 100° C. and in the presence of approximately 1% to 15%, based on the weight of 2,3,6-trichlorobenzaldehyde, of sodium pyrophosphate peroxide while adding sufficient aqueous sodium carbonate solution to said dispersion to maintain its pH in the range of 8–10; and (3) isolating trichlorobenzoic acid containing 50% to 80% of 2,3,6-trichlorobenzoic acid.

References Cited in the file of this patent
UNITED STATES PATENTS

| | | |
|---|---|---|
| 2,120,672 | Mares | June 14, 1938 |
| 2,245,528 | Loder | June 10, 1941 |
| 2,848,470 | Girard et al. | Aug. 19, 1958 |
| 2,850,527 | Binapfl | Sept. 2, 1958 |
| 2,899,465 | Girard et al. | Aug. 11, 1959 |

OTHER REFERENCES

Wagner et al.: Synthetic Organic Chemistry, pp. 98, 285 and 418 (1953).

Rodd: Chemistry of Carbon Compounds, vol. III A, pp. 87, 88, 128, 129, 543 (1954).

Brimelow et al.: J. Chem. Soc. (1951), pages 1208–12. (Copies in Library.)